United States Patent [19]

Arlott

[11] Patent Number: 4,626,996
[45] Date of Patent: Dec. 2, 1986

[54] AIRCRAFT DATA INSTRUMENTATION AND ACQUISITION SYSTEM

[75] Inventor: Raymond D. J. Arlott, Surrey, England

[73] Assignee: British Aerospace PLC, Surrey, England

[21] Appl. No.: 467,367

[22] Filed: Feb. 17, 1983

[30] Foreign Application Priority Data

Feb. 17, 1982 [GB] United Kingdom ............... 8204675

[51] Int. Cl.$^4$ ............................................. G06F 15/20
[52] U.S. Cl. ...................................... 364/424; 364/550
[58] Field of Search ............... 364/550, 551, 580, 424, 364/431.02, 431.04, 415; 371/20

[56] References Cited

U.S. PATENT DOCUMENTS

| | | | |
|---|---|---|---|
| 3,996,928 | 12/1976 | Marx | 364/415 |
| 4,168,527 | 9/1979 | Winkler | 371/20 |
| 4,184,205 | 1/1980 | Morrow | 364/550 |
| 4,300,207 | 11/1981 | Eivers | 371/20 |
| 4,397,021 | 8/1983 | Lloyd et al. | 371/20 |
| 4,402,054 | 8/1983 | Osborne et al. | 364/551 |
| 4,402,055 | 8/1983 | Lloyd et al. | 371/20 |
| 4,471,348 | 9/1984 | London et al. | 364/551 |

OTHER PUBLICATIONS

Electronics/Sep. 11, 1972, "Aerospace Computer Technology Catches Up with Ground Gear" (vol. 45, No. 19, pp. 112–119); C. Weitzman.

IEEE 1978 National Aerospace and Electronics Conference, 16-18th May, 1978, vol. 1, pp. 2–12, IEEE, New York, U.S.A., E. L. Cloud et al, "Modular Missionization Systems (MMS), an Adaptive System Interface Concept" (Particularly, p. 2, right-hand col., line 9, to p. 3, line 30 and FIGS. 1 and 2).

IEEE Technical papers of Nerem, vol. 15, part 1, Boston, 6th-8th Nov., 1973, pp. 147–150, IEEE, New York, U.S.A.; S. M. Max, "Linear Data Acquisition in a Computer Environment" (Particularly, p. 147, right-hand col.

Primary Examiner—Gary Chin
Attorney, Agent, or Firm—Cushman, Darby & Cushman

[57] ABSTRACT

An aircraft data acquisition system, especially a test data system, wherein a central control and acquisition computer receives data from a plurality of remote subunits each comprising a power supply and a local computer and being connected via a series of input/output modules to respective sets of sensing transducers. Each input/output module comprises a circuit including a series of links which can be made or unmade to adapt the module for driving and/or processing the output of any of a wide variety of transducer types.

8 Claims, 3 Drawing Figures

AIRCRAFT DATA INSTRUMENTATION AND ACQUISITION SYSTEM

BACKGROUND OF THE INVENTION

This invention relates to a data acquisition system for an aircraft, more particularly but not exclusively a test data acquisition and instrumentation system.

Any aircraft comprises a number of transducers which generate signals indicative of respective parameters, temperatures and pressures at various points, control positions, flying surface positions and so on, which signals are passed to a pilot display system and/or to the flight computer. When a prototype or experimental aircraft is being tested, it has to be fitted with possibly a large number of additional transducers the signals from which are recorded by a tape recorder for analysis following a test flight or ground test mission. Such testing is obviously a very important part of aircraft manufacture, but since the hardware required for carrying it out is not needed for normal operation of the eventual production aircraft, it has hitherto been designed and constructed on a somewhat piecemeal basis. Thus, usually a tape recorder and a central data acquisition or collection unit are purchased and the remainder of the required hardware, i.e. wiring harness, transducers and such, are designed so that they will fit, physically and functionally, a particular aircraft and to suit whatever recorder and acquisition unit are available. These factors have sometimes resulted in difficulties in installing and particularly in commissioning the test instrumentation.

SUMMARY OF THE INVENTION

According to one aspect of the invention, there is provided a data instrumentation and acquisition system for an aircraft, the system comprising a central data acquiring control computer unit having an input connected to a data bus and an output for connection to data recorder means;

a plurality of remote data acquisition sub-units each coupled to said data bus and each comprising power supply means, a local computer sub-system, and a plurality of connector means;

coupled to each said sub-unit via respective ones of the connector means of the sub-unit, a plurality of input-/output modules; and connected to an input of each input/output module an associated transducer which is operable for producing an electrical signal representative of a parameter to be sensed by the transducer, said power supply means of each sub-unit being connected to each connector means of the sub-unit to apply drive power to the input/output module coupled to that connector means and the transducer connected to that input/output module, and each said sub-unit and said input/output modules connected thereto being operable under the control of said central data-acquiring control computer unit to store, in digital form, a set of samples of the signals formed by the associated transducers and to transmit them in sequence to the central computer unit via said data bus. Advantageously, said sub-units and said input/output modules are operable for sampling all the transducer signals at the same time, for storing the resultant set of digital signals and for transmitting them in sequence to said data bus.

According to a second aspect of the invention, there is provided an input/output module for use in an aircraft data instrumentation and acquisition system as described above, the module comprising connector means for enabling it to be connected to a connector means of a sub-unit of said system, terminal means for connection to a transducer and, between said connector means and said terminal means, an interconnection circuit including a plurality of circuit path breaks between conductive portions suitable for having resistive or conductive links connected thereto to bridge the breaks, the interconnection circuit and said breaks being such that, by choosing the value of resistance of one or two resistive links, the level of drive voltage applied to an associated transducer can be chosen, and such that by coupling one or more resistors into the circuit, there can be made up part or all of a Wheatstone bridge circuit to which the transducer can be coupled.

Preferably, switch means are incorporated into said input/output module for enabling the application of the drive voltage to the transducer to be controlled. Even more preferably, a calibration switch is provided coupled to said interconnection circuit to apply a predetermined change to the resistance value of an arm of said bridge. Advantageously, an instrument amplifier used in the input/output module has gain control and offset adjustment terminals brought out to conductor portions for having selected values of resistor connected thereto to set the gain and offset of the amplifier. To make the input/output module even more adaptable to different types of transducer which may be used, it is preferred that a filter used in the module to process the transducer signal is a digital filter with a selectable cut-off frequency controllable via said connector means by the sub-unit to which the module is connected. Even more preferably in this connection, the module may further comprise memory means for storing a look-up table of processed signal values corresponding to respective transducer signal values, the processed signal values being stored at memory addresses identified by the associated transducer signal values and the transducer signal being used to address the memory.

It will be appreciated that a desirable feature of any aircraft system, but particularly of a test system, is that each unit thereof should be as small and compact as possible. To facilitate this, the data acquisition sub-units and input/output modules used in the acquisition and instrumentation system preferably make extensive use of integrated circuit components and/or thick film circuit implementation techniques.

BRIEF DESCRIPTION OF THE DRAWINGS

To illustrate the above and further aspects and preferred features of the invention and to give a better understanding thereof, reference will now be made, by way of example, to the accompanying drawings, in which.

DESCRIPTION OF THE PREFERRED EMBODIMENTS

Figure 1:
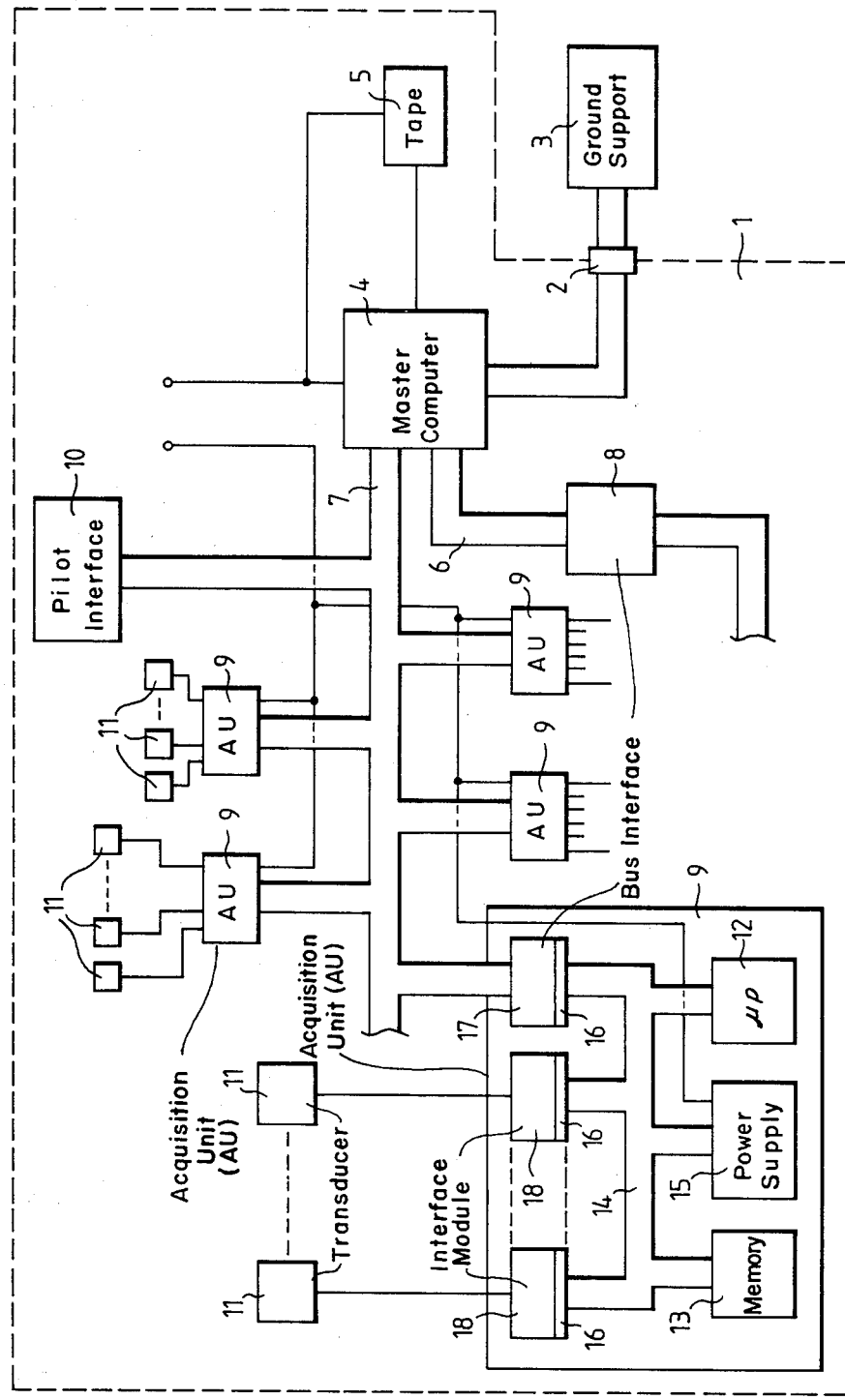
FIG. 1 is a simplified diagram of an aircraft test instrumentation and data acquisition system.

The test instrumentation and data acquisition system comprises the various units enclosed within the dash-lined box 1 in FIG. 1, these units being distributed about an aircraft (not shown) at positions where there is room for them within the mass of other equipment on-board the aircraft but, as far as possible, chosen for reasonably easy access and having regard to the respective functions performed by the units. By way of a suitable connector 2, the system may be coupled to ground support apparatus 3 including a computer, this being used for initial setting-up or programming of the system prior to take-off for a particular test-mission and also usable throughout any ground testing phase.

The on-board units include a master control unit 4 connected to a tape recorder 5, an on-board power supply (not shown) and, via data buses 6 and 7 respectively, to a bus interface unit 8 and a series of remote acquisition units 9. Bus 7 also communicates with a pilot interface unit 10 while each acquisition unit 9 is coupled to the on-board power supply and to a respective set of transducers 11. In the figure only some of the acquisition units and only a few transducers are shown but it will be appreciated that, in practice, there could be a fair number of the units and even a very large number of transducers.

In the figure, the construction of only one of the units 9 is illustrated—each other unit 9 being the same as this one. It comprises a microprocessor based computer system including a central processor unit 12, a Z8000 for example, and a memory and memory control arrangement 13. The memory includes some read-only memory capacity for holding the fixed operating programme of the acquisition unit and some random-access memory. The memory and memory control arrangement 13 is connected to the central processor unit 12 by way of a bus 14 which also interconnects with a power supply circuit 15 and with each of sixtyfour connector sockets 16 (only some of which are shown). Plugged into respective ones of the sockets are a series of input-/output modules. One of these modules, the module 17, is operable for interfacing the acquisition unit to the bus 7 and hence to the master control unit 4. The other modules 18 are analogue signal handling modules each connected to a respective one of the transducers 11, these transducers being of the kind which produce an analogue signal representing the parameter measured by the transducer. Thus, since there are sixtyfour sockets 16 of which one is occupied by the bus interface module 17, the acquisition unit can accommodate up to sixtythree of the modules 18 and a similar number of transducers 11. Of course, not all of the sockets need be occupied. Also, some transducers from which data has to be gathered may not be of the analogue signal producing kind. For example, some may provide a digital signal, or an alternating signal of which the frequency represents the measured parameter. For receiving such signals, a suitable digital interface module or frequency counter module may be plugged into a respective one of the sockets. There may also be provided modules for measuring say the time duration of a received signal pulse or other event and modules for processing the signals from synchrogenerator-type transducers.

Whatever the kind of input/output module, it will be operable for passing power to the relevant transducer from the power supply circuit 15, if the transducer is one which requires such a drive, and is further operable for receiving the output signal from the transducer for holding a digital signal representing a measurement of the transducer output signal taken whenever commanded to do so by the master control unit acting via the acquisition unit microprocessor. This microprocessor is operable, in response to commands from master control unit 4, for transferring the digital signals held by the different modules to the bus 7 in order as regards each other and the signals from other acquisition units. This ability of the input/output modules to hold signals means that the master control unit can issue a single common command which causes measurement of all the transducer signals to be taken at substantially the same instant even though the signals representing these measurements are then passed to the master control unit sequentially.

Figure 2:
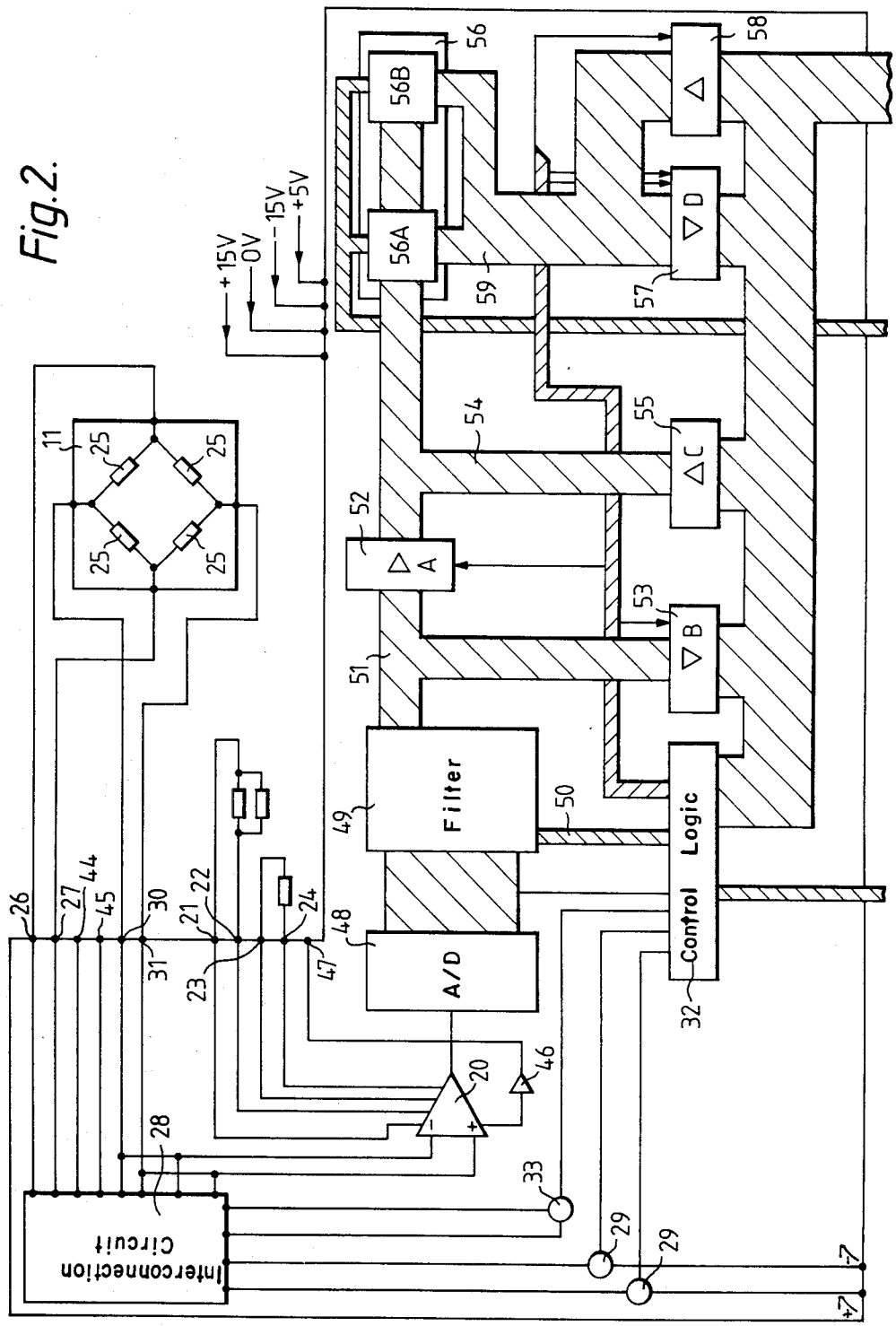
FIG. 2 is a simplified diagram of an input/output module used in the FIG. 1 system.

Each of the input/output modules 18, the construction of which is shown in FIG. 2, is adaptable to a range of different types of analogue signal transducer. For example, virtually all the types of transducer which may be needed are resistive in nature, i.e. they present a resistance value which varies with the transduced parameter. Also, the resistance usually forms or is intended to form one or more arms of a Wheatstone Bridge. Thus, a certain kind of pressure transducer which is available comprises a full Wheatstone Bridge, a platinum temperature measuring element could form one arm of such a bridge, while a potentiometer type of transducer can form two of the four arms. The illustrated module is constructed so that as many resistors as are needed to complete the bridge can be relatively easily incorporated or alternatively an entire bridge can be formed within the module to allow easier use of certain transducers. Also, any offset voltages required, the scaling and so on are all provided for within the module. Referring now to the figure, the module 18 comprises a instrument amplifier 20 of which the two gain control terminals and the two off-set adjustment terminals are connected to module terminals 21 to 24 respectively. By connecting resistors and/or combinations of resistors (to give the required resistance value) to these terminals as shown, the gain and offset of the amplifier can be accurately set for the particular type of transducer to be used.

The module is shown connected to a transducer 11 of the kind which comprises a full-bridge, i.e. with four resistance elements 25. Two opposite junction points of the bridge are connected to module terminals 26 and 27 at which there is presented a bridge excitation voltage derived via a selectable link and resistor arrangement 28 and two switches 29 from +7 and −7 volt module input terminals which, in turn, are fed by the power supply circuit 15 of the acquisition unit 9 wherein the module is installed. The other two bridge interconnection points are connected to module terminals 30 and 31 which also lead to the arrangement 28 and, respectively, to the inverting and non-inverting inputs of amplifier 20. Switches 29 are controlled by a control logic unit 32 of the module along with a calibration switch 33, an FET for example, which is operable for re-arranging the interconnections within arrangement 28 to allow a calibration process to be executed.

Figure 3:
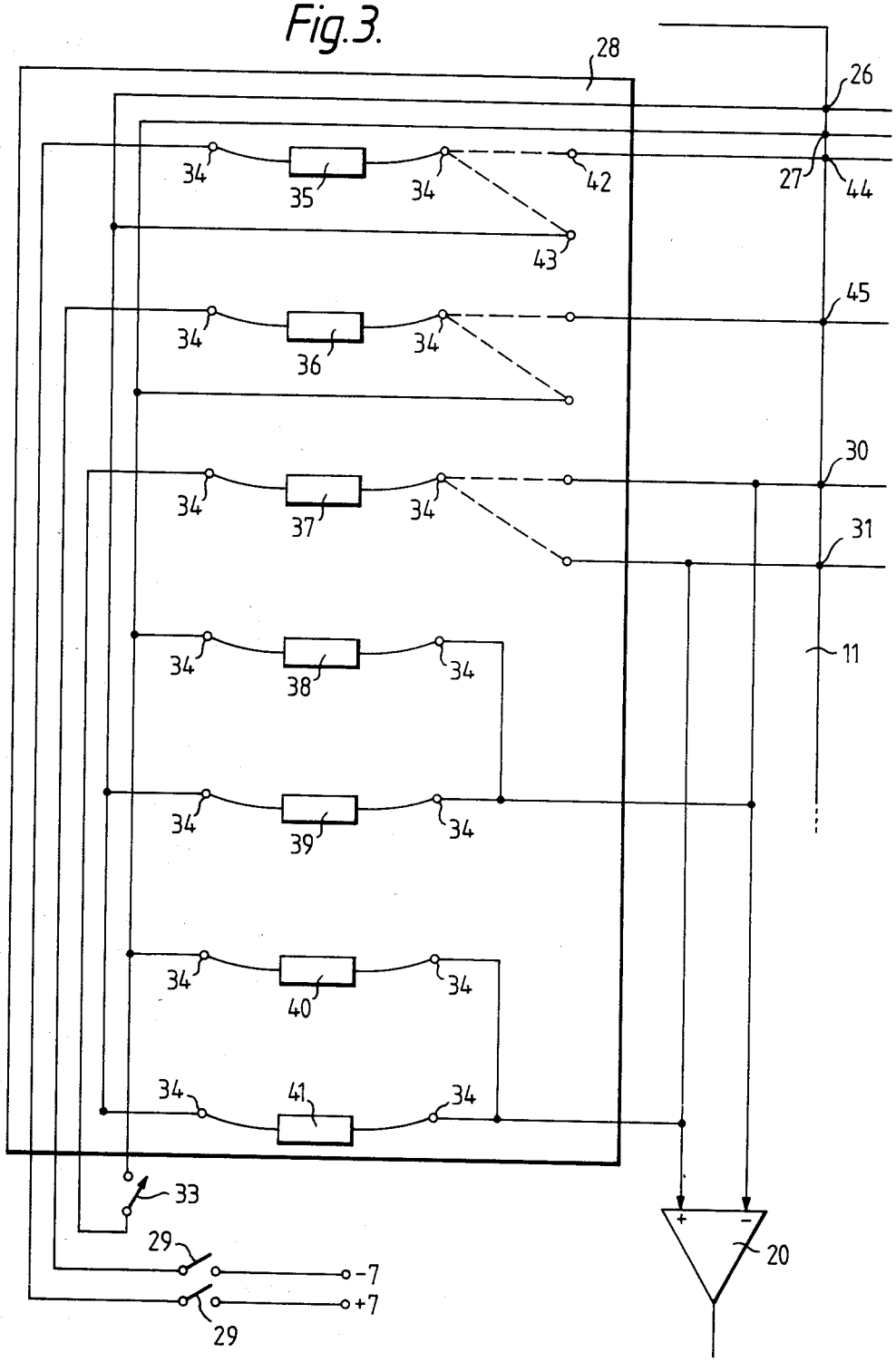
FIG. 3 is a diagram of an interconnection circuit used in the FIG. 2 module.

As shown in the enlarged view of FIG. 3, the arrangement 28 consists of seven pairs of terminals 34 for having selected resistors 35 to 41 coupled therebetween. The terminals are connected so that, when present, one side of resistor 35 is connected to one of the switches 29 and one side of resistor 36 is connected to the other switch 29, one side of resistor 37 is connected to one side of switch 33, the other side of this switch being connected to one side of resistor 40, one side of resistor 38 and to module terminal 27, and one side of each of the resistors 39 and 41 is connected to module terminal 26. The terminal 34 to which the other side of resistor 35 is connected is in physical proximity to two terminals 42 and 43 whereby, using a wire link, this terminal 34 can be connected to either terminal 42 or 43 and thereby either to a module terminal 44 or to module terminal 26. Similarly, the other side of resistor 36 can be connected to module terminal 27 or to a module terminal 45 and the other side of resistor 37 can be connected to terminal 30 or 31. Meanwhile, the other sides of resistors 38 and 39 are both connected to terminal 30 and the other sides of resistors 40 and 41 are both connected to terminal 31.

Resistors 35 and 36 are voltage drop resistors chosen to give the desired level of transducer excitation voltage, this voltage being made available at terminals 26 and 27 or terminals 44 and 45 as desired. If all the resistors 38 to 41 were to be inserted as shown, they would make up a full-bridge of which the interconnection points are connected to terminals 26, 27, 30 and 31 respectively. Consideration of FIGS. 2 and 3 will show that if the transducer comprises a full-bridge connected to terminals 26, 27, 30 and 31 as shown, each arm of the transducer bridge will be in parallel with an arm of the module bridge, i.e. with a respective one of the resistors 38 to 41. Thus, by inserting one, two or three of the resistors 38 to 41 as appropriate, a transducer which is not a full-bridge can be made so, whichever bridge arm or arms is or are missing from one transducer being made up in the arrangement 28. It will be seen also that by appropriate use of the links and terminals and choice of resistors, virtually any circuit arrangement can be made up. For example, in some cases, it may be desirable to have a full bridge in the arrangement 28 even when the transducer itself comprises a full-bridge, this possibly being of use where a "difficult" offset condition has to be accommodated.

When the calibration switch 33 is closed, resistor 37 becomes coupled across one of the bridge arms, the resistor being connected either to the inverting or non-inverting input of amplifier 20 in dependence upon which pair of link terminals associated with this resistor are coupled together. The resistor value is chosen so that this coupling produces a known change in the apparent value of the transduced parameter whereby the calibration of the system can be checked by the master control unit and adjusted if necessary. The switches 29 enable the drive to any transducer to be switched off when not required, so as to save power.

Referring again to FIG. 2, the amplifier 20 is of the kind which makes available a secondary output signal of which the level equals half the sum of the absolute voltage values, referred to the 0 volt amplifier supply at the two amplifier inputs. This secondary output is buffered by amplifier 46 and made available at module terminal 47 to provide a guard voltage for the braid of a coaxial cable, if used, connecting the transducer to the module.

The transduced parameter representing output signal from amplifier 20 is passed to an analogue to digital converter 48 which samples the signal at a high rate, perhaps 25,000 times per second, and provides a digital representation of each sample at its output. The digital signals at this output are applied to a digital three-pole Butterworth filter 49 of which the cut-off frequency is selectable by the control logic unit 32 acting via control bus 50, between a series of suitable values respectively appropriate for the various kinds of transducer and transduced parameter. By way of example, the cut-off frequency may be chosen from the values 5, 20, 100 and 1000 Hz. Preferably, the control logic unit is operable also to bypass the filter so that the signals from converter 48 can be passed on unchanged. Information for causing the unit 32 to bypass the filter or to set up a chosen cut-off frequency is loaded into the unit 32 from the central processing unit 12 in the associated acquisition unit 9 during the start-up sequence of the overall system.

The parallel-bit output from filter 49, which output might comprise say ten parallel bits, is applied via bus 51 to the input sides of each of two latching gate circuits 52 and 53. The output side of gate circuit 52 is connected via bus 54 to the output side of a latching gate circuit 55 and to the address terminals of an electrically programmable read-only memory 56. The data terminals of the memory 56 are connected via bus 59 to the input side of a latching gate circuit 57 and the output side of a latching gate circuit 58. The control logic unit 32, the output sides of gates 53 and 57 and the input sides of gates 55 and 58 are each coupled to acquisition unit bus 14.

During normal operation, gate 52 is open while gates 53, 55, 57 and 58 are closed. Thus, the digital output from converter 48 passes via filter 49 and gate 52 to the address terminals of memory 56, which memory has its data output permanently enabled by unit 32 and which acts as a look-up table for converting the transduced parameter representative signals to engineering unit values. These values are loaded at appropriate addresses in memory 56 so that, for each value of the signal received along bus 54, there is a corresponding stored value which is applied, when addressed, to bus 59. When a data read command is received from the master control unit 4 (FIG. 1), the central processor 12 in each acquisition unit issues a so-called "staticise" signal to the control logic unit 32 of each associated input/output module whereupon this logic unit 32 causes gate 57 to load the data then being received via bus 59. Subsequently, a further appropriate command signal to unit 32 causes the loaded data to be applied to bus 14 and hence made available to central processor unit 12 for transfer onto the main system data bus 7.

In order to calibrate the input/output module, it is plugged into a calibration unit (not shown) which may be somewhat like the acquisition unit, i.e. with one or more suitable sockets for receiving respective modules and a computer system which may be microprocessor based but in which the computer system is programmed for somewhat different tasks. Namely, this system will be operable to cause the control logic unit 32 in the module to switch off gate circuit 52 and then, while the transducer 11 is sensing a series of known parameter values, gate circuit 53 is operated to make the corresponding digital signals appearing at the output of filter 49 available to the calibration unit via bus 14. Thereby, the calibration unit computer system can acquire a list of actual digital signal values, along with the respective parameter values, spread over the required dynamic range of the transducer. The calibration unit then carries out any required alterations to the values, for example linearisation, conversion to engineering unit representative values and so on. At some point, if necessary, an erase voltage is applied to the memory 56 to remove any pre-existing data therein—possibly, the calibration unit is constructed to carry out such erasure but, if not, it may be done by an appropriate separate piece of apparatus. Thereafter, gate circuit 53 is closed by unit 32, the calibration unit computer system steps through the addresses of the memory 56 and inserts at the respective addresses the appropriate signal values, gate circuits 55 and 58 being operated meanwhile to accommodate this insertion.

With the input/output modules and transducers installed in the acquisition system and the aircraft and system being set-up ready to carry out a test mission, the system as a whole, i.e. including the master control unit, is first loaded with a test programme appropriate to the particular mission via the ground support apparatus 3 in FIG. 1. This involves causing each acquisition unit 9 to check and identify the modules 11 which it is supporting, suitable identifying data having been introduced into the memory 56 of each input/output module as part of the calibrating process done in relation thereto. The particular method by which the identification is carried out may be a matter of choice subject to various factors such as the amount of memory space available in memory 56, the total number of transducers used and so on. The system illustrated is intended to enable each transducer to be identified by what is called a "MIL Standard Number", which is a term familiar to those skilled in the art. A total of seventeen data bits are required for each such number. Meanwhile, the memory 56 comprises two eight-bit wide EEPROM memory units 56A and 56B as shown, for example, each unit may have a 1024×8 bit capacity. Meanwhile, if each signal data word is ten-bits wide and if every memory address is to receive signal data, then the identification data has to be put into the remaining address bits and consequently has to be spread over at least three addresses, say the first three. Accordingly, the acquisition unit microprocessor system is programmed so that, during mission set-up, it can be made to carry out an interrogation process in which it feeds the first memory address along bus 14 into gate 55 which latches that address onto bus 54. The first part of the transducer identifying number is then read from the content of the first memory address received via bus 59, gate 57 and bus 14. Then, via bus 14, the address latched onto bus 54 by gate 55 is incremented, the second part of the transducer identifying number is read and so on. As will be appreciated, the described scheme leaves free a column of memory space six bits wide and extending over as many addresses, less three, as are contained in each unit 56A and 56B. This space may be used for additional identifying data or transducer associated descriptive information if desired.

Referring back to FIG. 1, as may have been realised, power supply circuit 15 in each unit 9 comprises a voltage stabilising circuit operable to derive from the aircraft supply, usually at 28 volts, the +7 and −7 volt level applied via each module 18 to drive the associated transducer. It also derives voltage levels, say 0, +5, −5, +15 and −15, needed to drive the components of the acquisition unit and each input/output module connected thereto.

The pilot interface unit 10 is constructed to provide whatever level of pilot intervention and information is required as regards the test mission. For example, it may enable him to control the operation of the recorder 5, in particular to select the parameters which are recorded, and may include a display unit which the pilot can cause to display his selection of parameters and which may also indicate status information such as power supply or tape recorder failure. A further function of unit 10 may be to pick up for recording various pilot instigated events, i.e. relevant operations of the aircraft controls.

As will be realised, an aircraft normally comprises a number of transducers and a computer system as a standard part of its flying equipment and data may be sent between this computer and these transducers on a multiplex basis via a data bus. This bus may operate on a somewhat different standard to that used in connection with the test data acquisition system. In particular, it may well be in accordance with what is called in the art the MIL standard 1553 which fixes all sorts of system parameters such as the data format, bit-rate and so on. On the other hand, in view of the relatively large amount of information needed in the test procedure, the test data acquisition system may have to depart from the standard parameters, particularly to gain additional speed of communication. Thus, if the two systems are to intercommunicate, which would normally be desirable, a suitable communication device is required. This device is the bus interface unit 8 in FIG. 1. The construction of this unit is largely a matter of choice having regard to the test acquisition system parameters but, as will be appreciated, it will normally comprise a computer system, again microprocessor based for preference, in the local memory of which there will have been stored a series of addresses of terminals coupled to the flight equipment data bus, the addresses being introduced as part of the test mission set-up procedure. Then, when commanded by the master control unit 4, it will look for those addresses on the data bus, store the resultant data in its local memory and, at a further command from unit 4, will slot that data into the stream dealt with by the unit 4 after making any necessary conversions.

The function of the master control unit is to supervise the operation of the various acquisition units, to receive and store data therefrom and to communicate with the units 8 and 10 and the ground support apparatus 3, and to pass data to the tape recorder 5 for recording. The master control unit will thus comprise a computer system having a memory capacity appropriate to all these functions. Supervision of the acquisition unit 9 includes outputting a common clock signal train thereto to maintain operational synchronism, the generation of commands to sample the transducer signals, and commands associated with the test mission set-up process. For recording, the unit 4 collects the data supplied by the acquisition units and formats it into the form required for recording. For example, the unit may produce a series, up to four say, of different PCM data streams, the format of each stream being appropriate to the information content thereof.

At any stage in the system, e.g. in the acquisition units 9 or at the unit 4, data compression techniques may be applied to ease handling of the data, particularly during tape replay following mission completion.

As mentioned earlier, the ground support unit 3 is used to programme the system ready for a particular test mission. By way of example, a series of storage discs with the programmes for respective kinds of mission may be preformed whereby an operator can simply select the appropriate disc and insert it into a reader of the apparatus 3 whereupon the required programme is loaded. Advantageously, the programme and system together will be operable to carry out set-up error check procedures. For example, should the selected programme call for a transducer which has not in fact been installed, this will be indicated to the operator via apparatus 3.

The input/output module shown in FIG. 2 could be modified in various ways. As a first example of this, the digital filter 49 could be replaced by an analogue to digital converter and the analogue to digital converter 48 could be replaced by an analogue filter. Preferably, this analogue filter is such that, as with the digital filter 49, its cut-off frequency can be varied under the control of the control logic unit 32. For example, the filter could comprise a multiple stage active filter of which each stage comprises an amplifier, a network of frequency response determining components and switch-means having a control input connected to unit 32 and operable to render effective selected ones or sets of the response determining components and hence to set the overall filter cut-off frequency to a selected one of a series of predetermined values, for example the series mentioned earlier for the digital filter or a different series (one such different series which has been found useful comprises the values 5, 50, 100 and 1000 Hz along with a 'filter disabled' state, i.e. where the filter is set to give no filtering action). The analogue-to-digital filter which replaces digital filter 49 may well have a sample timing control input which can then be controlled via a suitable connection line by the unit 32 and it may well also have a tristate latching circuit at the side thereof connected to bus 51. If so, the latching gate circuit 52 may be able to be discarded, the proper operation of the apparatus being obtained by proper control of the gates 53, 55, 57 and 58 and the internal latching circuit of the analogue-to-digital converter.

As a second example of a possible modification to FIG. 2, while the described capacity and arrangement of the look-up table memory 56 is advantageous from the point of view of economy, it may be better to provide additional capacity here in order say to allow the table output values to be stored in a full floating-point format compatible with a particular chosen model of computer. For this, each value might be 32 bits wide and additional electrically-eraseable read only memory units along with any necessary additional latching gates can be provided alongside the memory units 56A and 56B and the gates 57 and 58 to accommodate them.

A particular advantage of the use of a look-up table under the control of the control test computer 4 is that the data acquired from the module can generally always be obtained in so called engineering units. As well as linearisation, this may involve say the reinstatement of offsets and perhaps even calculation. As an example of offset reinstatement, say that a particular pressure transducer measures pressures over the range 1000 to 2000 p.s.i. and the signal received by the module varies from say 0 representing 1000 p.s.i. and a maximum V representing 2000 p.s.i. By suitably setting-up the look-up table values, the actual values of p.s.i. i.e. from 1000 to 2000 are immediately available from the module. Without the acquisition system as particularly described herein, the basic signal values may have to be recorded and, following the test-mission, converted to engineering units which, remembering that the mission will have produced possibly a very large number of such values from a very large number of sources, can be somewhat laborious. As an example of calculation, a certain aircraft test may require the pilot to fly the aircraft with a constant value of a parameter $n/\sqrt{\theta}$ where n is the engine fan speed $\theta$ is the outside air temperature. Of course, some sort of ad-hoc indicator could be set up to display the value of $n/\sqrt{\theta}$ to the pilot but again it must be remembered that aircraft testing involves a large number of different tests, each requiring perhaps a different calculation. With the system described when an $n/\sqrt{\theta}$ test is to be carried out the computer simply sets the look-up table values, in a module receiving an indication of fan speed n, in dependence upon the signal from an outside temperature transducer so as to give a direct read-out of $n/\sqrt{\theta}$ and display thereof at pilot interface unit 10.

As mentioned earlier, the module shown in FIG. 2 is configured for outputting a drive for the relevant transducer 11 and for inputting a parameter representative current or voltage signal from that transducer. To adapt the module to accept a transducer signal of which the frequency represents the parameter, the same general construction might be used but with the filter 49 and the parts to the left thereof in FIG. 2 (but not of course the control unit 32) replaced by a suitable digital frequency counter or possibly by a frequency to voltage converter and an associated analogue to digital converter.

One or more of the modules could be adapted so that, instead of receiving data from a transducer, it outputs a control signal to some associated piece of apparatus. For this, the filter 49 and the parts to the left thereof in FIG. 2 might be replaced by digital-to-analogue converter say, or perhaps by just some form of digital latching circuit if a digital control signal is required from the module.

A particularly advantageous use of such adapted modules arises in connection with what might be called stimulus response testing of an aircraft where measurements are to be made of the response of the aircraft and/or equipment or stores carried thereon to particular stimulating actions. For example, it might be necessary to measure the amount of movement and vibration undergone by stores carried by the aircraft in response to certain movements and vibrations undergone by the aircraft as a whole. For this, respective control signal output modules might be arranged to provide, when commanded by the computer 4, fixed or repetively varying offset signals direct to the aircraft control surface drives while other modules receive signals from transducers, accelerometers say, arranged to sense the response of the stores. Another example would be the measurement of the response time of the aircraft autopilot—for this, a control signal output module could be arranged to inject a navigation parameter offset into the autopilot so that the aircraft goes off-course to a controlled degree and then to remove that offset whereupon further modules can receive data concerning the time taken for the autopilot to resettle with the aircraft on-course again. As will be realised, when such stimulus response testing of an aircraft is carried out by generating the stimulus via the normal aircraft control bus, it may be much more complex and involved than is allowed by use of the test system as described above. This is because a stimulus applied to the normal bus may well have effects on various components and sub-units not directly associated with the test and, for each and every test, all such components and sub-units may need to be re-programmed—in effect, so that they all know what is going on and do not react adversely.

What is claimed:

1. A data acquisition system for an aircraft, the system comprising:
   a central control and data acquisition computer connected to a digital signal bus and to data recorder means;

a plurality of data acquisition sub-units for being mounted at respective positions distributed about said aircraft and each comprising a local computer, bus interface means connected to said digital signal bus in parallel with the bus interface means of each other sub-units, power supply means, and a plurality of disengageable electrical connector devices each connected to an output of said power supply means, to said local computer and to said bus interface means;

for each data acquisition sub-unit, a plurality of analog signal transducers for sensing respective aircraft operating parameters and, for each transducer, an adaptive transducer interface module, each interface module comprising transducer drive signal supply means connected to the power supply means of the associated data acquisition sub-unit via a respective one of the connector devices of that sub-unit, analog-to-digital conversion and signal holding means connected to the local computer and bus interface means of said associated data acquisition sub-unit via said respective one of the connector devices of that sub-unit, transducer connector terminal means connected to the associated transducer to said transducer drive signal supply means and to said analog-to-digital conversion and signal holding means, first, second, third and fourth pairs of electrically conductive elements, and circuit support means for mounting said pairs with the elements of each pair positioned adjacent one another for having a resistor connected therebetween, said transducer connector terminal means including a first terminal which is connected to one electrically conductive element of each of the first and third pairs thereof, a second terminal which is connected to one electrically conductive element of each of the second and fourth pairs thereof, a third terminal which is connected to the other electrically conductive element of each of the first and second pairs thereof, and a fourth terminal which is connected to the other electrically conductive element of each of the third and fourth pairs thereof;

said drive signal supply means of each interface module being operable for deriving, from the output of the power supply means of said associated data acquisition sub-unit, drive signals for driving the transducer connected to the interface module; said analog-to-digital conversion and holding means of each interface module being operable, under the control of the local computer of said associated data-acquisition sub-unit, to form and hold digital signals representing samples of the analog signal supplied by the transducer connected to that interface module and to make said held digital signals available to the local computer of said associated data acquisition sub-unit; each said local computer being operable, under the control of said central control and data acquisition computer, to cause the digital signals made available to it to be transferred in sequence to said central computer via said digital signal bus; and said central computer being operable to cause said digital signals to be recorded by the data recorder means.

2. A system according to claim 1, wherein the interface modules are operable for sampling all of the transducer signals at the same time and for holding the resultant digital signals; and the local computers are operable, under the control of the central computer, for transmitting said digital signals in sequence to said digital signal bus.

3. A system according to claim 1, wherein each interface module comprises switch means connected between the power supply means of the associated data acquisition sub-unit and the drive signal supply means of the interface module, the switch means being operable, under the control of the local computer of said associated data acquisition sub-unit, for switching on and off the supply to the drive signal supply means.

4. A system according to claim 1, wherein each interface module comprises controllable frequency filtering means connected to said analog-to-digital conversion and holding means and operable under the control of the local computer of the associated data acquisition sub-unit to selectably control the frequency response to the interface module.

5. A system according to claim 1, wherein each interface module comprises data store means connected to said analog-to-digital conversion and holding means and containing a look-up data table relating actual values of the associated transducer signal with corresponding desired values to be transferred to said central computer.

6. A system according to claim 1, wherein said drive signal supply means of each interface module comprises a fifth and sixth pair of adjacent electrically conductive elements mounted on said circuit support means and respective resistors connected between the elements of each of these pairs, one element of each of these pairs being connected to the power supply means of the associated data acquisition sub-unit and the other element of each of these pairs being connected to a respective terminal of said transducer connector terminal means.

7. A system according to claim 1, wherein each interface module includes a further pair of adjacent electricall conductive elements mounted on said circuit support means, a resistor connected between the elements of said further pair, and switch means connected between one element of said further pair and said drive signal supply means, the other element of said further pair being connected to said analog-to-digital conversion and signal holding means and said switch means being operable, under the control of the local computer of the associated data acquisition sub-unit, for causing a transducer calibration signal to be applied to said analog-to-digital conversion and signal holding means via said further pair of electrically conductive elements and the resistor connected therebetween.

8. A system according to claim 5, wherein said data store means also contains data identifying the associated transducer, the local computer of each data acquisition sub-unit being operable for reading the transducer identifying data from the data store means of each interface module connected to that sub-unit.

* * * * *